(12) United States Patent
Henttu

(10) Patent No.: US 7,263,140 B2
(45) Date of Patent: Aug. 28, 2007

(54) EXTRACTING SIGNAL COMPONENTS IN RADIO SYSTEM RECEIVER

(75) Inventor: Pertti Henttu, Varjakka (FI)

(73) Assignee: Nokia Corporation, Espoo (FI)

( * ) Notice: Subject to any disclaimer, the term of this patent is extended or adjusted under 35 U.S.C. 154(b) by 533 days.

(21) Appl. No.: 10/700,545

(22) Filed: Nov. 5, 2003

(65) Prior Publication Data

US 2004/0091065 A1 May 13, 2004

Related U.S. Application Data

(63) Continuation of application No. PCT/FI02/00381, filed on May 6, 2002.

(30) Foreign Application Priority Data

May 7, 2001 (FI) .................................. 20010952

(51) Int. Cl.
*H04L 27/06* (2006.01)
*H04L 25/08* (2006.01)
(52) U.S. Cl. ....................... 375/340; 375/346
(58) Field of Classification Search ................ 375/316, 375/285, 346, 340, 130, 140, 144, 147, 260; 370/335, 342, 441
See application file for complete search history.

(56) References Cited

U.S. PATENT DOCUMENTS 5,671,247 A * 9/1997 Souissi et al. ............... 375/144
6,411,250 B1 * 6/2002 Oswald et al. ................ 342/70
6,816,539 B1 * 11/2004 Rog ........................... 375/147

FOREIGN PATENT DOCUMENTS

| GB | 2 304 000 A | 3/1997 |
|---|---|---|
| WO | WO99/39445 | 8/1999 |

OTHER PUBLICATIONS

A. Ranheim: "Narrowband Interference Rejection in Direct-Sequence Spread-Spectrum System Using Time-Frequency Decomposition", IEE Proceedings (Dec. 1995), vol. 142, Issue 6, pp. 393-400.
H. Goldman: "Performance of the Excision CFAR Detector in the Presence of Inteferers", IEE Proceedings (Jun. 1990), vol. 137, pp. 163-171.

* cited by examiner

*Primary Examiner*—Tesfaldet Bocure
(74) *Attorney, Agent, or Firm*—Squire, Sanders & Dempsey L.L.P.

(57) ABSTRACT

A receiver in a radio system, the receiver comprising means for receiving a signal, an analogue-to-digital converter for providing signal samples from the received signal. The receiver comprises means for selecting a set of signal samples, means for forming a statistical function value on the basis of the selected signal sample values, means for forming a threshold value on the basis of the statistical function value and a preset threshold parameter, means for dividing the samples between a set within the statistical distribution and a set outside the distribution by using the threshold value as a limit, and means for repeating said statistical function value formation by using the set in accordance with the distribution, said threshold value formation and said division of samples into said sets if the termination condition for repetition is not fulfilled.

27 Claims, 6 Drawing Sheets

EXTRACTING SIGNAL COMPONENTS IN RADIO SYSTEM RECEIVER

This application is a Continuation of International Application PCT/FI02/00381 filed on 6 May 2002, which designated the U.S. and was published under PCT Article 21 (2) in English.

FIELD OF THE INVENTION

The field of application of the invention includes digital radio systems, and particularly, blind signal processing performed in signal reception in said systems.

BACKGROUND OF THE INVENTION

In a radio system, interfering signals are often summed to a transmitted signal on the radio path, which makes the reception of the transmitted signal difficult. One way to eliminate signal interference in a receiver is so-called blind interference suppression, in which interference suppression is performed on the signal without knowledge of an interfering signal. In a receiver, the blind interference suppression is performed immediately after an analogue-to-digital conversion, prior to synchronization and detection of the received signal. Thus, the decision making is only based on the time and frequency information included in the received signal.

Average and median methods of frequency and time domains, for instance, represent the prior art in the receiver. In the average method, a power average is formed for signal samples, and using a preset, standardized threshold value the signal sample values exceeding the threshold value are set to zero. In the median method, in turn, from among signal samples, the samples exceeding the threshold value are zeroed on the basis of the median.

The prior art solutions have considerable drawbacks. The average method does not satisfactorily consider changes in the channel, and consequently the interference suppression remains unsatisfactory. Significant problems are encountered, for instance, in a situation, where there are few interference spikes in the received signal. The interference suppression based on the average method may then zero also samples that belong to the actual, desired signal. The median method, in which the samples have to be arranged in the order of magnitude on the basis of the value, is in turn unnecessarily complex computationally to implement in the receiver.

BRIEF DESCRIPTION OF THE INVENTION

It is thus an object of the invention to provide an improved method and equipment implementing the method for receiving a signal in a radio system. This is achieved with the following method for blindly extracting a broadband signal from a narrowband signal in time domain, the method comprising receiving a signal in a mobile system receiver, performing an analogue-to-digital conversion on the received signal so as to provide signal samples; the method comprising selecting a set of signal samples, modifying the selected signal sample set so as to provide a set in accordance with the distribution, forming a statistical function value on the basis of the signal sample values of the set in accordance with the distribution, forming a threshold value on the basis of the statistical function value and a preset threshold parameter, dividing the samples of the set in accordance with the distribution between the set in accordance with the distribution and a set outside the distribution by using the threshold value as a limit, repeating said statistical function value formation using the sample set in accordance with the distribution, said threshold value formation and said division of the samples into said sets, if a termination condition for the repetition is not fulfilled, and after fulfilment of the termination condition, setting to a set value the samples from the selected signal sample set which belong to the set in accordance with the distribution or to the set outside the distribution.

The invention also relates to a method for blindly extracting a broadband signal from a narrowband signal in frequency domain, the method comprising receiving a signal in a mobile system receiver, performing an analogue-to-digital conversion on the received signal so as to provide signal samples; the method comprising selecting a set of signal samples, converting the selected signal sample set to frequency domain, modifying the selected signal sample set so as to provide a set in accordance with the distribution, forming a statistical function value on the basis of the signal sample values of the set in accordance with the distribution, forming a threshold value on the basis of the statistical function value and a preset threshold parameter, dividing the samples of the set in accordance with the distribution between the set in accordance with the distribution and a set outside the distribution by using the threshold value as a limit, repeating said statistical function value formation using the signal sample set in accordance with the distribution, said threshold value formation and said division of the samples into said sets, if a termination condition for the repetition is not fulfilled, and after fulfilment of the termination condition setting to set value such samples from the selected signal sample set that belong to one of the following sets: the set in accordance with the distribution, the set outside the distribution, and transforming the set comprising the selected signal samples by means of an inverse transformation of the transformation method employed back to the time domain.

The invention also relates to a receiver in a radio system, the receiver comprising means for receiving a signal, an analogue-to-digital converter for providing signal samples from the received signal. The receiver comprises means for selecting a set of signal samples, means for modifying the selected signal sample set so as to form a set in accordance with the distribution, means for forming a statistical function value on the basis of the signal sample values of the set in accordance with the distribution, means for forming a threshold value on the basis of the statistical function value and a preset threshold parameter, means for dividing the samples between the set in accordance with the distribution and a set outside distribution by using the threshold value as a limit, means for repeating said statistical function value formation by using the sample set in accordance with the distribution, said threshold value formation and said division of the samples into said sets if a termination condition for the repetition is not fulfilled, and means, after fulfilment of the termination condition, for setting to a set value such samples from the selected signal sample set that belong to one of the following sets: the set in accordance with the distribution and the set outside distribution.

The invention also relates to a receiver in a radio system, the receiver comprising the means for receiving a signal, an analogue-to-digital converter for providing signal samples from the received signal. The receiver comprises means for selecting a set of signal samples, means for converting the selected signal sample set to the frequency domain, means for modifying the selected signal sample set so as to form a set in accordance with the distribution, means for forming a statistical function value on the basis of the selected signal samples, means for forming a statistical function value on the basis of the signal sample values of the set in accordance with the distribution, means for forming a threshold value on the basis of the statistical function value and a preset threshold parameter, means for dividing the samples of the set in accordance with the distribution between the set in accordance with the distribution and a set outside distribution by using the threshold value as a limit, means for checking a termination condition, means for repeating said statistical function value formation by using the sample set in accordance with the distribution, said threshold formation and said division of the samples into said sets if a termination condition for the repetition is not fulfilled, and means, after fulfilment of the termination condition, for setting to a set value such samples that belong to one of the following sets: the set in accordance with the distribution and the set outside distribution, and means for converting the set comprising the selected signal samples by an inverse transformation of the transformation method employed back to the time domain.

The inventive solution can be applied to digital radio systems. The radio systems according to the invention include e.g. digital mobile systems, such as GSM (Global System for Mobile Communication), UMTS (Universal Mobile Telephony System) and other digital radio systems, such as WLAN (Wireless Local Area Network) solutions. The inventive idea relates to blind signal processing in the receiver, i.e. processing, in which a received signal is processed without knowledge of an interfering signal. Said blind signal processing is performed in the receiver immediately after the analogue-to-digital conversion.

The inventive solution is suitable for use in various situations, where blind decision making can be applied. In one preferred embodiment, a narrowband interfering signal is removed from a received, broadband signal by means of the inventive solution. According to another preferred embodiment, the receiver is intended to receive a narrowband signal, whereby a broadband signal that can be considered interference is removed from the received signal.

The inventive solution is not restricted to a domain in which the received signal is processed. In one preferred embodiment, the received signal is processed in time domain. In another preferred embodiment the processing of the received signal is carried out in frequency domain, to which the signal is converted by any known method, such as Fast Fourier Transform (FFT).

In the inventive solution, a sample set of a given length, for instance one transmitted symbol long, is selected from the sampled signal. For the sample set is calculated a statistical function value, such as energy average, which in the frequency domain is an average of magnitude. Instead of the average the statistical method used in connection with the inventive solution can be median, standard deviation, variance or the like known statistical methods. The energy values of the sample set are compared with the threshold value and the samples are divided into a set in accordance with the distribution and a set outside distribution. The threshold formation employs a calculated energy average of the sample set and a threshold parameter within distribution. The threshold parameter refers to e.g. Rayleigh distribution, in which, for instance, the value 99% corresponds to the parameter value 2.42. In this connection the percentage 99% means that in the case of a noise-free channel 99% of the signal to be received will actually be received. The sample set processing uses the set in accordance with the distribution, from which the samples that remain outside distribution are removed, i.e. the samples that exceed the threshold value. The iteration process of the sample set will be repeated until the sample set under checking remains unchanged, i.e. not a single sample exceeds the formed threshold value. It is also possible to use the number of iteration rounds as the termination condition.

Several advantages are achieved by the invention. In the inventive solution, the threshold value used in the division of the samples is formed in a manner that allows good performance in signal extraction in varying reception conditions. The method of the invention is computationally simple, which enables advantageous use of the solution in the receiver of the radio system.

BRIEF DESCRIPTION OF THE DRAWINGS

In the following, the invention will be described in greater detail in connection with preferred embodiments, with reference to the attached drawings, wherein.

DESCRIPTION OF THE PREFERRED EMBODIMENTS

Figure 1:
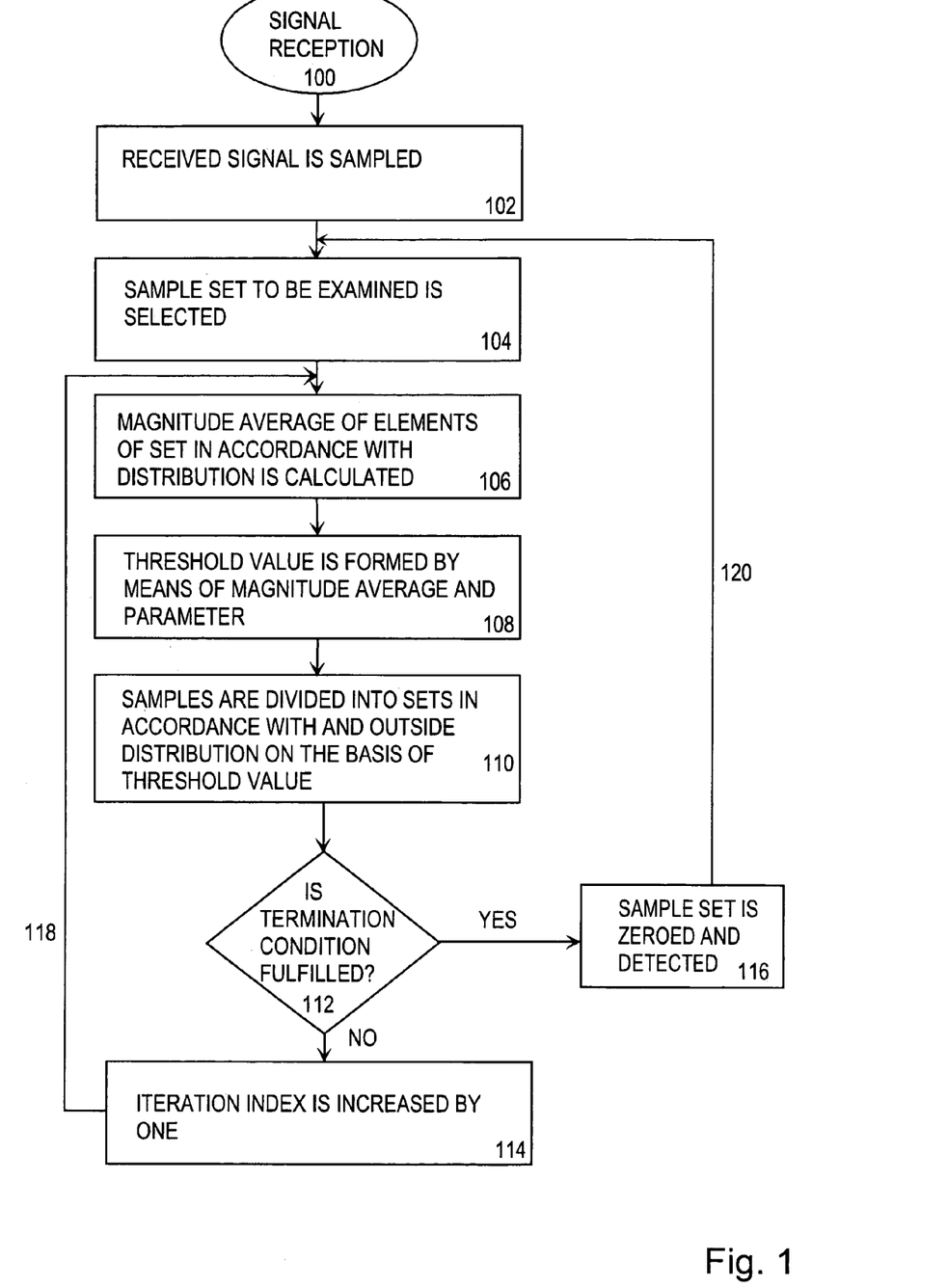
FIG. 1 shows one preferred embodiment of the method according to the invention.

In the following the invention will be described by means of preferred embodiments, with reference to the attached drawings. FIG. 1 shows one preferred embodiment of the method according to the invention. The initial step of the method represents signal reception in a digital radio system receiver, which in the solution of the invention can be either a radio system base station or a terminal device, such as a mobile station. An analogue signal to be received is sampled in method step 102. The sampling interval is determined in the radio system employing the code division multiple access (CDMA) method, for instance, on the basis of the spreading ratio of the spreading code used. In step 104, a set of digital samples is selected from the sampled signal. Advantageously, the sample set to be selected is so large that it covers at least one transmitted symbol.

In method step 106 is computed an average of the magnitudes of the samples in the sample set selected in step 104. In a situation of FIG. 1, the signal is thus checked in time domain, without conversion to frequency domain. In method step 108 is formed a threshold value, by means of which the samples of the sample set are divided into a sample set in accordance with the distribution and a sample set outside distribution. The formation of the threshold value utilizes a threshold parameter, which can be determined theoretically on the basis of the statistical characteristics of a noise-free signal. Because Gaussian noise is the dominating, i.e. the largest, component of the received signal, the distribution of magnitudes is Rayleigh distributed with two degrees of freedom. The threshold parameter can be determined in the following manner. The Rayleigh distribution average is $$E(X) = \sqrt{2\sigma^2}\Gamma(1.5). \quad (1)$$

The cumulative density function of a Rayleigh distributed random variable is given by formula (2).

$$F(x) = 1 - e^{-\frac{x^2}{2\sigma^2}}. \quad (2)$$

Equation (2) can be solved for x by $$x = \sqrt{2\sigma^2}\sqrt{-\ln(1-F(x))}. \quad (3)$$

In one preferred embodiment of the method according to the invention, the samples of the sample set are divided between the set in accordance with the distribution and the set outside distribution on the basis of a threshold value employed. The threshold parameter is given by Equation (4)

$$T = \frac{x}{E(x)} = \frac{\sqrt{2\sigma^2}\sqrt{-\ln(1-F(x))}}{\sqrt{2\sigma^2}\,\Gamma(1.5)} = \frac{\sqrt{-\ln(1-F(x))}}{\Gamma(1.5)} \quad (4)$$

As it can be seen from Equation (4), the threshold parameter T does not depend on the variance of noise. Variable F(x) represents a percentual share of the observations. The threshold values computed by Equation (4) as a function of F(x) are presented in Table 1.

TABLE 1

A threshold parameter T as a function of F(x)

| F(x) | T |
|------|------|
| 0.999 | 2.97 |
| 0.99 | 2.42 |
| 0.95 | 1.95 |
| 0.9 | 1.71 |

It appears from Table 1 that if in the case of a noise-free signal, for instance, it is desired to recover 99% of the information of the desired signal, the value 0.99 of x is used, which gives 2.42 as the value of the threshold parameter T.

Instead of the average, it is also possible to calculate e.g. a square of the magnitudes for the samples of the sample set in method step 106 and to use Chi-square distribution, instead of the Rayleigh distribution. By using the square of the magnitudes it is possible to avoid a comprehensive computational operation of the square root in the receiver. Change of the distribution does not cause any changes in the method used, except that the threshold parameter values have to be altered to comply with the distribution.

Reference is again made to the method FIG. 1, a threshold value used in dividing the samples is formed in step 108. The threshold value is formed by multiplying the threshold parameter T by the average of the magnitudes of the sample set examined. In method step 110, the sample values below the formed threshold value are divided into a set in accordance with the distribution and the samples with magnitude above the threshold value into a set outside distribution. The samples with energy of exactly the threshold value are divided, depending on the embodiment, into either one of the above sets.

In method step 112, it is checked whether the termination condition of iteration is fulfilled or whether a new iteration round is needed, which comprises method steps 106 to 110. In one preferred embodiment, the termination condition used is that a given number of iteration rounds, e.g. 10, is performed on the selected sample set in step 104. In another preferred embodiment the termination condition used is that the samples remain in their sets, in the set in accordance with the distribution and the set outside distribution. This means that in step 112 none of the samples needed be transferred from one set to the other. If the termination condition is fulfilled in a condition node 112, the signal samples are applied to block 116, where the sample set is zeroed. For instance, this means that if narrowband interference, which is placed in the set outside distribution as a result of iterations, is being extracted from a broadband signal, the samples corresponding to the narrowband signal are zeroed in the selected sample set in step 104. Zeroing refers to setting the sample magnitude to zero. If the desired signal is a narrowband signal, the set to be zeroed in step 116 is the set in accordance with the distribution. The sample set, from which either the sample set in accordance with the distribution or the sample set outside distribution has been zeroed, is applied to detection 116, and according to step 120, the receiver proceeds to read a new set of samples.

If the termination condition is not fulfilled in step 112, the process proceeds to step 114, where the index representing the number of iterations is increased by one, whereafter the next iteration round is proceeded to, as indicated in step 118.

In the solution of FIG. 1, the samples representing the broadband signal are transferred to the set in accordance with the distribution in the course of the iterations, and the samples representing an interfering signal are transferred to the set outside distribution. In this case the interfering signal may consist of impulses of short duration, which may be generated at the output of an adaptive filter. By means of the inventive solution, it is possible to extract the broadband signal and the interfering signal from one another. The solution can also be applied to systems, where the desired signal is either a narrowband or a broadband signal. If the desired signal is a broadband signal, the samples representing the desired signal are transferred in the course of the iterations to the set in accordance with the distribution, whereas the desired signal being a narrowband signal, the samples representing the desired signal are transferred to the sample set outside distribution.

Method step 106 described how the average of the sample magnitudes of the sample set examined was calculated. However, the inventive solution is not restricted to whether the samples of the sample set are examined in the time domain or whether the sample set is converted to the frequency domain prior to iterations.

Figure 2A:
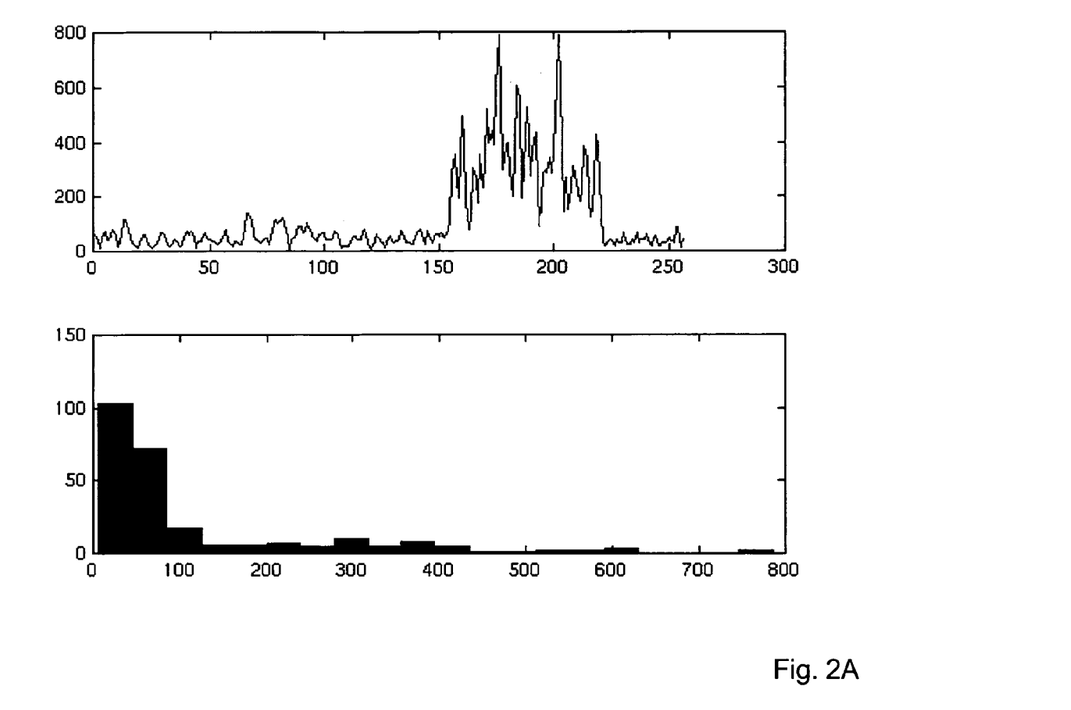
FIG. 2A illustrates a received signal and a signal distribution index.
Figure 2B:
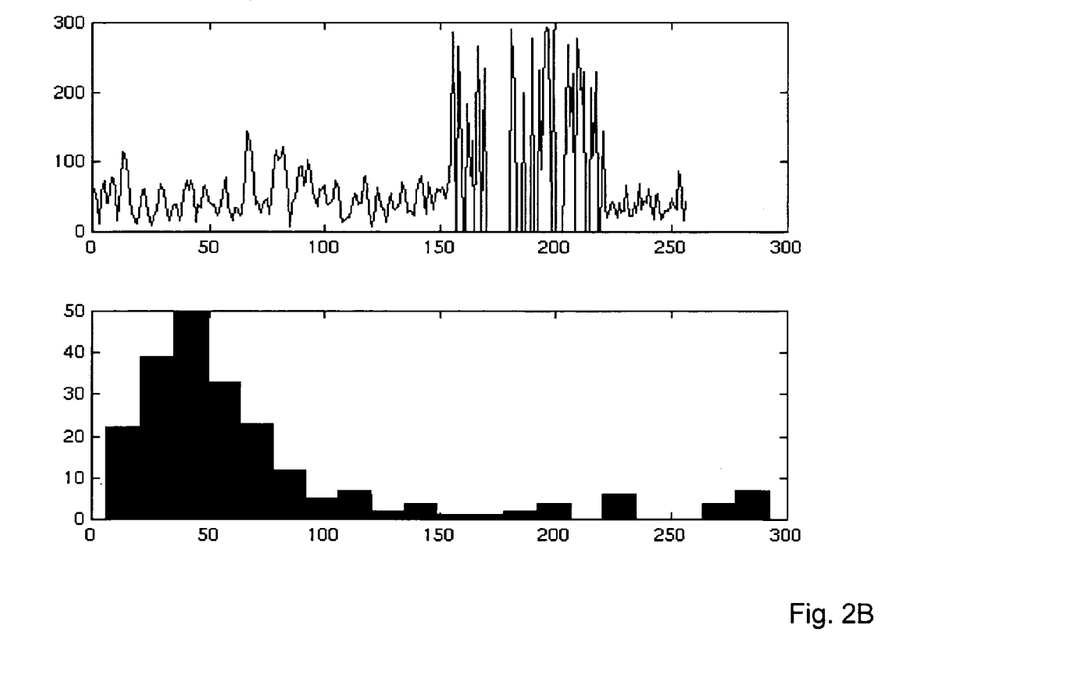
FIG. 2B illustrates the received signal and the signal distribution index after a first iteration round.
Figure 2C:
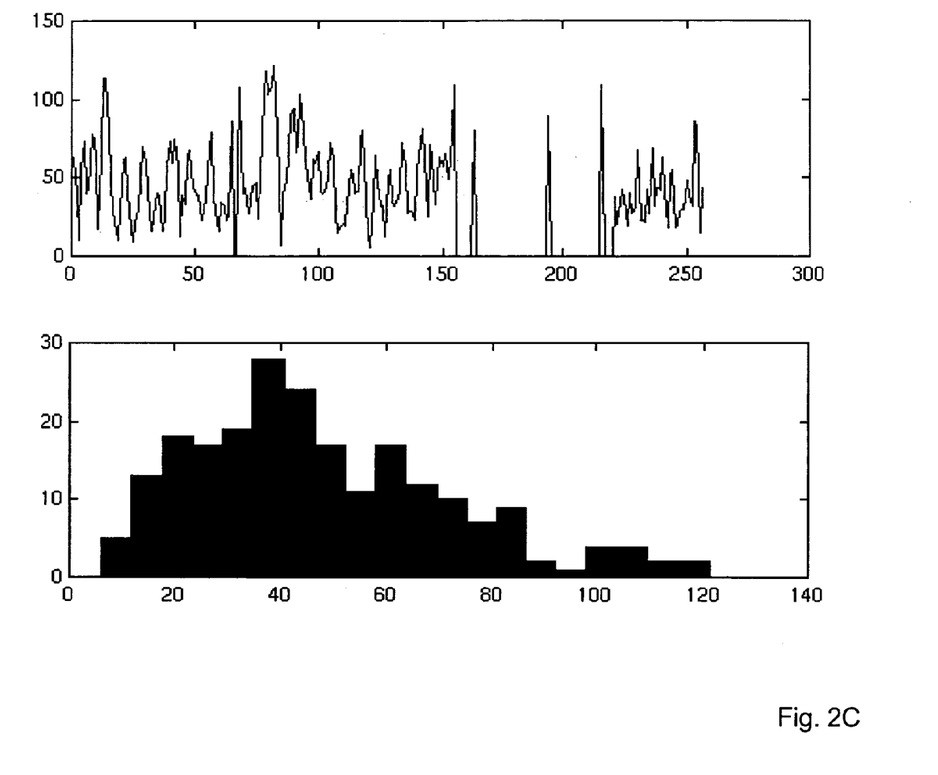
FIG. 2C illustrates the received signal and the signal distribution index after a second iteration round.

The solution according to one preferred embodiment of the invention is illustrated next, with reference to FIGS. 2A to 2C. Each of the FIGS. 2A to 2C comprises an upper figure, in which the vertical axis represents values of the signal magnitude spectrum and the horizontal axis represents signal frequency. In the lower figures of FIGS. 2A to 2C the corresponding upper figure signal is depicted such that the number of signal samples is represented as a function of the magnitude spectrum value on the horizontal axis. FIG. 2A shows the received signal without any iteration rounds. It appears from the figure that in the received signal the narrowband interfering signal is roughly within the frequency range of 150 to 220. The magnitude spectrum levels of a broadband signal are considerably lower than those of a narrowband signal, whose highest spikes reach up to 800. The lower, magnitude index figure indicates that the distribution is not yet at this stage, without any iteration rounds, Rayleigh distributed. It can be seen from the magnitude index figure that the average of the distribution is about 120. The example employs the value 2.42 from Table 1, which means that in the case of a noise-free signal 99% of the specific signal would be received. The product of the distribution average 120 and the threshold parameter 2.42 is about 300, which is employed as the threshold value in the first iteration round. FIG. 2B illustrates the set in accordance with the distribution of the first iteration round, in which the samples exceeding the threshold value 300 are zeroed or transferred into the set outside distribution. It can be seen from the magnitude index picture of FIG. 2B that the distribution starts resembling the Rayleigh distribution, even though at high power levels 250 to 300 there are still too many samples for the Rayleigh distribution. The average of the distribution in FIG. 2B is no longer more than 60, which gives a new threshold value of about 150, when multiplied by the preset threshold parameter 2.42. FIG. 2C illustrates a distribution obtained by the second iteration round. The average of the distribution is about 50, and multiplied by the threshold parameter 2.42 gives about 120. It can be seen from the upper figure of FIG. 2C that in the distribution there are no longer samples whose level exceeds the provided threshold value, so the termination condition of iterations is fulfilled. The magnitude index representation of FIG. 2C also follows the Rayleigh distribution.

Let us study yet another preferred embodiment of an algorithm implementing the method of the invention in the frequency domain. The algorithm is described in Table 2. It is assumed that the received baseband signal r comprises a desired direct sequence signal d, noise n and interference J, i.e. according to Equation (5):

$$r = d + n + J. \quad (5)$$

The received signal is first converted to the frequency domain by using a fast Fourier transform, i.e.

$$R = FFT(r). \quad (6)$$

Thereafter the signal sample set is modified by forming a magnitude spectrum according to Formula (7), which magnitude spectrum will be used as feed data in the algorithm.

$$X = \{x_i | i \in I_k\} = |R|. \quad (7)$$

TABLE 2

Description of algoritm

Start of algorithm: $X_k = \{x_k | i \in I_k\}$, where $X_k$ is the examined sample set in iteration round k and $I_k$ includes the indices of the samples of the examined sample set in iteration round k. $J_k$ includes the indices of the samples of the sample set outside distribution in iteration round k. At the start of the method k = 0, whereby $J_0 = \{\ \}$.
Step 1: The sum of set $X_k$ is calculated, $$S_k = \sum_{i \in I_k} x_i$$

Step 2: The number of samples in set $X_k$ is calculated, $N_k = size(X_k)$
Step 3: Index sets $I_{k+1}$ and $J_{k+1}$ are searched, where $$I_{k+1} = \left\{ i \in I_k \,\middle|\, x_i \leq \frac{TS_k}{N_k} \right\}$$

and

TABLE 2-continued

Description of algoritm $$J_{k+1} = \left\{ i \in I_k \,\middle|\, x_i > \frac{TS_k}{N_k} \right\}$$

Step 4: The size of the set outside distribution $J_{k+1}$ is calculated, i.e. the number of the samples
Step 5: If size($J_{k+1}$) = 0 or the maximum number of iterations is achieved, step 10 is proceeded to
Step 6: The index set $J_{k+1}$ is stored
Step 7: The sum of the set $X_k$ is updated, $$S_{k+1} = S_k - \sum_{i \in J_{k+1}} x_i$$

Step 8: The size of the set $X_k$ is updated,
$N_{k+1} = N_k - size(J_{k+1})$
Step 9: The index is increased k = k + 1, step 3 is returned to
Step 10: The index set $J_1 \cup J_2 \cup \ldots \cup J_k$ refers to an interfered signal, so it will be zeroed in the frequency domain prior to an inverse transformation IFFT calculation from R.

Figure 4:
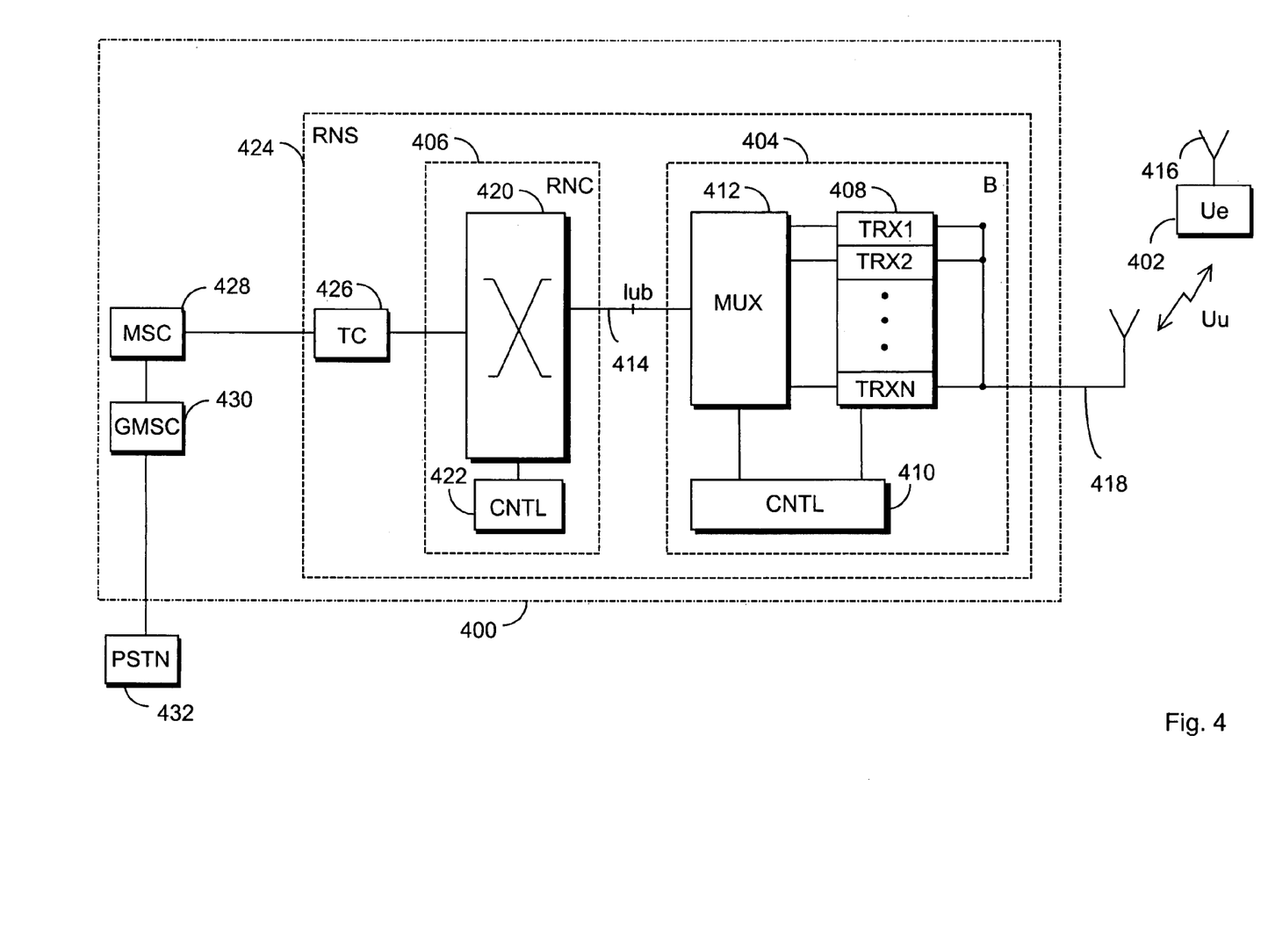
FIG. 4 shows one embodiment of a mobile system.

In the following the invention will be described with reference to the attached device figures illustrating a mobile system and a receiver in the mobile system. The description of the mobile system is based on the Universal Mobile Telephony System (UMTS) that is given here as an example, but also other digital radio systems are in accordance with the invention. FIG. 4 shows the structure of the UMTS mobile system in principle. The figure only shows the blocks that are essential to the description of the invention, but it is obvious to a person skilled in the art that a conventional mobile system also includes other functions and structures that need not be described in greater detail herein. The main parts of the system include a core network CN, a UMTS terrestrial radio access network UTRAN, and a user equipment UE. The interface between CN and UTRAN is known as Iu, and the air interface between UTRAN and UE is known as Uu. Functionality relating to a downlink radio connection to UE takes place in UTRAN. CN, in turn, takes care of routing and connections to systems outside the UMTS network, such as PSTN (Public Switched Telephony Network) and the Internet.

UE comprises two parts, of which ME (Mobile Equipment) acts as a radio terminal and takes care of communication over the Uu interface, and USIM (UMTS Subscriber Identity Module) is a smart card that contains data necessary for user identification and authentication. UTRAN comprises one or more radio network subsystems RNS, each of which comprising one or more radio network controllers RNC and B nodes, i.e. base stations. The most important task of the B node is to take care of the air interface towards UE and the relating processing, such as channel coding, interleaving, power control and spreading of user signals. RNC, which controls the node B, takes care of UTRAN radio resource control and loading situation of the cells belonging to RNC and is also responsible for the functionality relating to the allocation of new spreading codes in the cells. A control network CN comprises e.g. GMSC (Gateway MSC) providing access to external networks, a home location register HLR of the network, a mobile services switching center MSC providing routing functionality of the mobile exchange, a visitor location register VLR and SGSN (Serving GPRS (General Packet Radio Service) support Node) providing routing services for packet-switched connections.

Figure 3:
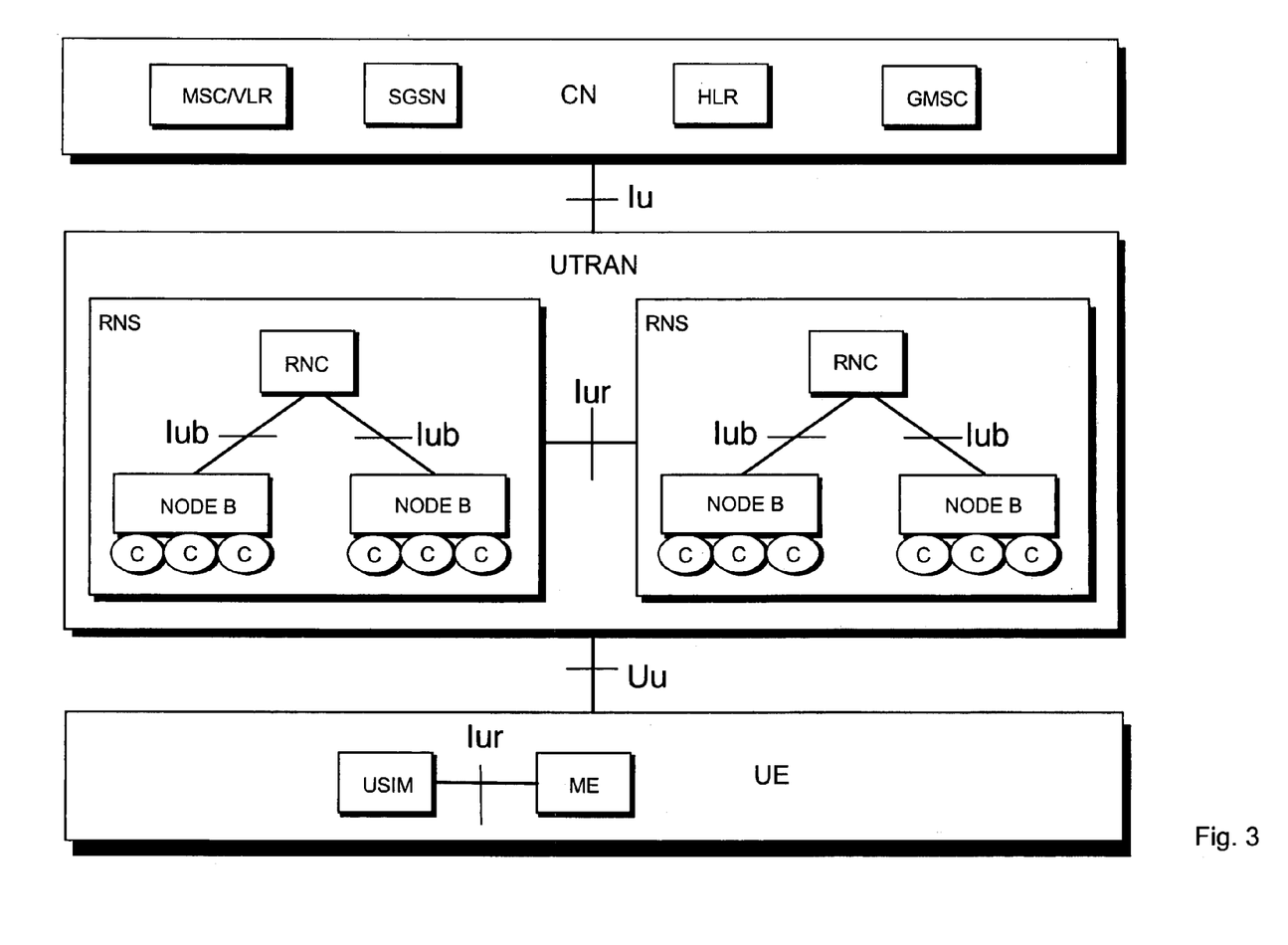
FIG. 3 is a block diagram of the UMTS mobile system.

The description in FIG. 3 is of rather general nature, so FIG. 4 gives a more detailed example of the cellular radio system. FIG. 4 only shows the most essential blocks, but it is obvious to a person skilled in the art that a conventional cellular radio network also comprises other functions and structures that need not be described in greater detail herein. The details of the cellular radio system may differ from those set forth in FIG. 4, but these differences are not relevant to the invention. Typically, the cellular radio network thus comprises a fixed network infrastructure, i.e. a network part 400, and user equipments 402, which can be fixed, placed in a vehicle or portable mobile terminals, such as mobile stations or portable computers, by which it is possible to communicate with a radio telecommunication system. The network part 400 comprises base stations 404. The base station 404 corresponds to the B node of FIG. 3. A plurality of base stations 404 are, in turn, controlled in a centralized manner by a radio network controller 406 that communicates therewith. The base station 404 comprises transceivers 408 and a multiplexer unit 412. The base station 404 further comprises a control unit 410, which controls the operations of the transceivers 408 and of the multiplexer 412. The multiplexer 412 is used for placing the traffic and control channels used by a plurality of transceivers 408 on one transmission connection 414, which constitutes an interface Iub.

The transceivers 408 of the base station 404 have a connection to an antenna unit 418, by which a radio connection 416 to the user equipment 402 is implemented. The structure of the frames to be transmitted over the radio connection 416 is defined system-specifically and it is known as the air interface Uu. The radio network controller 406 comprises a group switching field 420 and a control unit 422. The group switching field 420 is used for switching speech and data and for connecting signalling circuits. The radio network subsystem 424 comprised by the base station 404 and the radio network controller 406 also comprises a transcoder 426. The transcoder is generally located as close to the mobile services switching center 428 as possible, because speech can then be transmitted between the transcoder 426 and the radio network controller 406 in the same form as in the cellular radio system, saving thus transmission capacity. The transcoder 426 converts the different digital coding modes of speech between the public switched telephone network and the radio telephone network to be mutually compatible, for instance from the fixed network mode to another mode of the cellular radio network, and vice versa. The control unit 422 performs call control, mobility management, collection of statistical data and signalling. FIG. 4 further shows a mobile services switching centre 428 and a gateway mobile service switching centre 430, which takes care of the mobile system connections to external networks, in this example to the public switched telephone network 432.

Receivers according to some embodiments of the invention are described next, with reference to FIGS. 5A and 5B. It is obvious that the receiver can also comprise other parts than those shown in the figures. The receiver set forth may be located, for instance, in a base station of the radio system, in a fixed terminal device, in a portable mobile station, in a palm-top computer or the like.

Figure 5A:
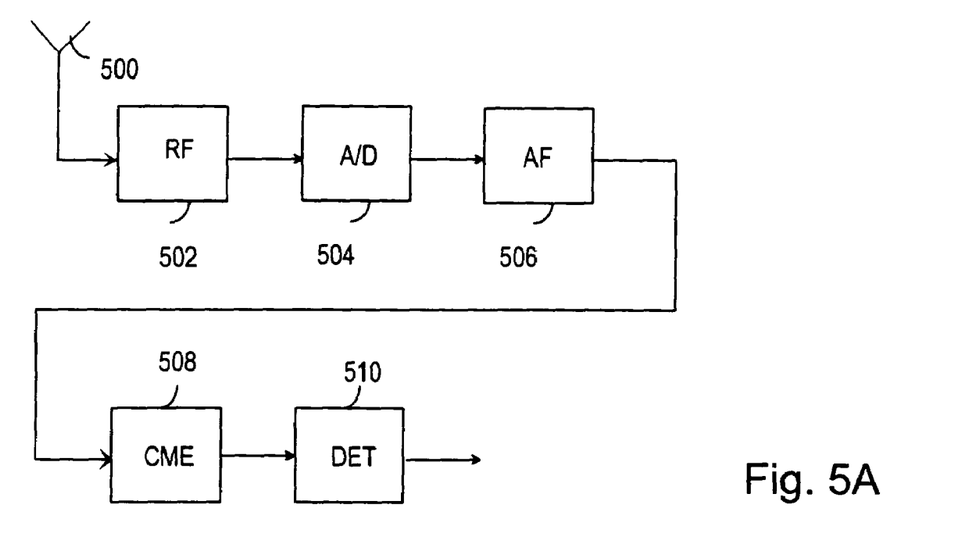
FIG. 5A shows a receiver of a first preferred embodiment of the invention.

The receiver of FIG. 5A comprises an antenna or an antenna array 500 consisting of antenna elements and radio frequency parts 502, in which the received signal is filtered, down-converted either directly to the baseband or to an intermediate frequency and amplified. In block 504 the signal is converted from analogue to digital by sampling and quantizing. The sampled signal is applied to an adaptive filter 506, which suppresses non-impulsive interference from the received signal. In some interference situations, the adaptive filter generates strong interference impulses, which can be removed by CME block 508 of the inventive solution. The task of the CME block is to extract the broadband signal from the narrowband signal in a manner according to the method of the invention. In FIG. 5A the signal extraction is performed in the time domain prior to transferring the signal to a detection block 510 of the receiver. FIG. 5B illustrates a receiver according to a second preferred embodiment, in which the signal extraction is performed in the frequency domain, for instance for the blind interference suppression. The transformation from the time domain to the frequency domain is carried out in block FFT 512, where the method used is e.g. the known Fast Fourier Transformation (FFT). Instead of the FFT, it is possible to use the Discrete Cosine Transformation DCT, Wavelet or Extended Lapped Transformation ELT. The transformation from the frequency domain back to the time domain is carried out in the inverse transformation block IFFT 514 of the receiver, where an inverse method of the transformation method of the FFT block is employed.

Figure 5B:
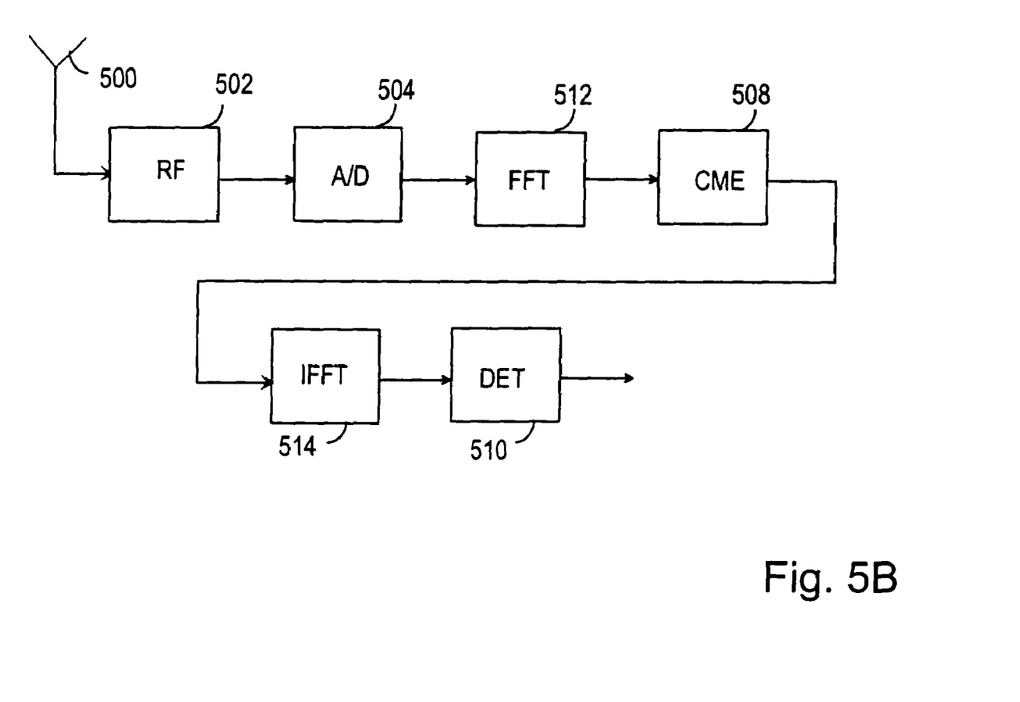
FIG. 5B shows a receiver of a second preferred embodiment of the invention.

The method steps of the receivers shown in FIGS. 5A and 5B and implementing the invention are performed, for instance, by means of software for the micro processor of the receiver, as an application specific circuit (ASIC) or by means of logic components.

Even though the invention is described above with reference to the example of the drawings, it is obvious to a person skilled in the art that the invention is not restricted thereto but it may be modified in a variety of ways within the scope of the inventive idea disclosed in the attached claims.

The invention claimed is:

1. A method of processing a signal in radio system, the method comprising:
   receiving a signal in a mobile system receiver,
   performing an analogue-to-digital conversion on the received signal so as to provide signal samples,
   the method further comprising
   selecting a set of signal samples,
   fitting the samples in the set of signal samples into a statistical distribution,
   removing such signal samples, which fall outside the statistical distribution of the set of signal samples, when using a statistical function threshold value of the statistical distribution as a limit;
   repeating the fitting of signal samples in the set of signal samples into a statistical distribution and the removing of signal samples from the set of signal samples until a predetermined condition for the repetition is fulfilled; and
   using the obtained sample set for signal detection.

2. A method as claimed in claim 1, further comprising:
   storing the set of signal samples,
   converting the stored set of signal samples into a frequency domain;
   converting the set of signal samples into a time domain when the predetermined condition for the repetition is fulfilled.

3. A method as claimed in claim 1, wherein in the method interference is removed from the received signal without knowledge of the interfering signal.

4. A method as claimed in claim 1, wherein a criterion for removing signal samples from the set of signal samples is determined by an excised portion of the Rayleigh distribution and the mean of the distribution of the noise-free signal.

5. A method as claimed in claim 1, wherein the signal sample set is selected such that it covers a symbol length in the transmitted signal.

6. A method as claimed in claim 1, comprising:
forming an average of magnitude or a magnitude spectrum for the samples in the set of signal samples, and
using the average of magnitude or a magnitude spectrum as a criterion when deciding whether signal samples are to be removed from the set of signal samples.

7. A method as claimed in claim 1, wherein the predetermined condition is induced from the signal within distribution being Gaussian-distributed on reception.

8. A method as claimed in claim 1, wherein the predetermined condition used is that a given number of repetition rounds is fulfilled.

9. A method as claimed in claim 1, wherein the predetermined condition used is that there are no samples to remove from the set of signal samples.

10. A method as claimed in claim 1, wherein in the method narrowband interference is removed from a broadband signal.

11. A method as claimed in claim 1, wherein in the method broadband interference is extracted from a narrowband signal.

12. A method as claimed in claim 1, wherein either samples representing a narrowband signal component of samples representing a broadband signal component are fitted into the statistical distribution.

13. A method as claimed in claim 1, wherein the samples in the signal sample set are zeroed after the repetition is finished.

14. A method as claimed in claim 1, wherein absolute values of the signal sample values are used for the samples in the set of signal samples when fitting the samples into the statistical distribution.

15. A method as claimed in claim 14, wherein squares of the absolute values of the signal sample values are used for the samples in the set of signal samples when fitting the samples into the statistical distribution.

16. A receiver in a radio system, the receiver comprising:
means for receiving a signal,
an analogue-to-digital converter for providing signal samples from the received signal,
wherein the receiver comprises
means for selecting a set of signal samples,
means for modifying the selected signal sample set so as to form a set in accordance with the distribution,
means for forming a statistical function value on the basis of the signal sample values of the set in accordance with the distribution,
means for forming a threshold value on the basis of the statistical function value and a preset threshold parameter,
means for dividing the samples between the set in accordance with the distribution and a set outside distribution by using the threshold value as a limit,
means for repeating said statistical function value formation by using the sample set in accordance with the distribution, said threshold value formation and said division of the samples into said sets if a termination condition for the repetition is not fulfilled, and
means, after fulfilment of the termination condition, for setting to a set value such samples from the selected signal sample set that belong to one of the following sets: the set in accordance with the distribution and the set outside distribution.

17. A receiver in a radio system, the receiver comprising:
a receiving unit configured to receive a signal,
an analogue-to-digital converter configured to provide signal samples from the received signal,
wherein the receiver comprises
a selecting unit configured to select a set of signal samples,
a converting unit configured to convert the selected signal sample set to the frequency domain,
a modifying unit configured to modify the selected signal sample set so as to form a set in accordance with a distribution,
a first forming unit configured to form a statistical function value on the basis of the selected signal samples,
a second forming unit configured to form a statistical function value on the basis of the signal sample values of the set in accordance with the distribution,
a third forming unit configured to form a threshold value on the basis of the statistical function value and a preset threshold parameter,
a dividing unit configured to divide the samples of the set in accordance with the distribution between the set in accordance with the distribution and a set outside distribution by using the threshold value as a limit,
a checking unit configured to check the termination condition,
a repeating unit configured to repeat said statistical function value formation by using the sample set in accordance with the distribution, said threshold value formation and said division of the samples into said sets if a termination condition for the repetition is not fulfilled, and
a setting unit, after fulfilment of the termination condition, configured to set to a set value such samples from the selected signal sample set that belong to one of the set in accordance with the distribution and the set outside distribution, and
a converting unit configured to convert the set comprising the selected signal samples by an inverse transformation of the transformation method employed back to the time domain for further use in signal detection.

18. A receiver as claimed in claim 17, wherein the preset threshold parameter has been determined based upon an excised portion of the Rayleigh distribution and the average of the distribution of the noise-free signal.

19. A receiver as claimed in claim 17, wherein the means the selecting unit is arranged to select the sample set such that it covers a symbol length in the transmitted signal.

20. A receiver as claimed in claim 17, wherein the forming unit is configured to form the average of magnitude or magnitude spectrum as the statistical function value.

21. A receiver as claimed in claim 17, wherein the repeating unit is configured to use as the termination condition the fact that the signal within distribution is Gaussian-distributed on reception.

22. A receiver as claimed in claim 17, wherein the repeating unit is configured to use as the termination condition the fact that a given number of iteration rounds is fulfilled, each round comprising the formation of a statistical function value, the formation of a threshold value and the division of samples into the sample sets.

23. A receiver as claimed in claim 17, wherein the repeating unit is configured to use as the termination condition the fact that in the sample division into the sample sets, all the samples remain in their sample sets.

24. A receiver as claimed in claim 17, wherein the receiver is configured to remove narrowband interference from a broadband signal.

25. A receiver as claimed in claim 17, wherein the receiver is configured to remove broadband interference from a narrowband signal.

26. A receiver as claimed in claim 17, wherein the means for setting to the set value comprised by the receiver are configured to set the samples of the selected signal sample set to the threshold value.

27. A receiver as claimed in claim 17, wherein the setting unit is configured to set the samples of the selected signal sample set to zero.

* * * * *